3,211,749
THIOTHIOPHTHENE COMPOUNDS AND
PROCESSES
Erwin Klingsberg, Mountainside, N.J., assignor to American Cyanamid Company, Stamford, Conn., a corporation of Maine
No Drawing. Filed June 26, 1963, Ser. No. 290,594
2 Claims. (Cl. 260—327)

This invention relates to, and has for its object, the provision of thiothiophthene derivatives by a new process involving the preparation of new intermediates. More particularly, it relates to the reaction of a dithiolium salt having an aryl substituent and a free position adjacent to a ring sulfur, with either a vinyl ether or a ketomethylenic compound to give a 3-acylmethylenic dithiole which is converted to the desired thiothiophthenes by treatment with phosphorus pentasulfide. All the various aspects of this invention will be better understood by reference to the following detailed description thereof.

The process of this invention is summarized by the following equations:

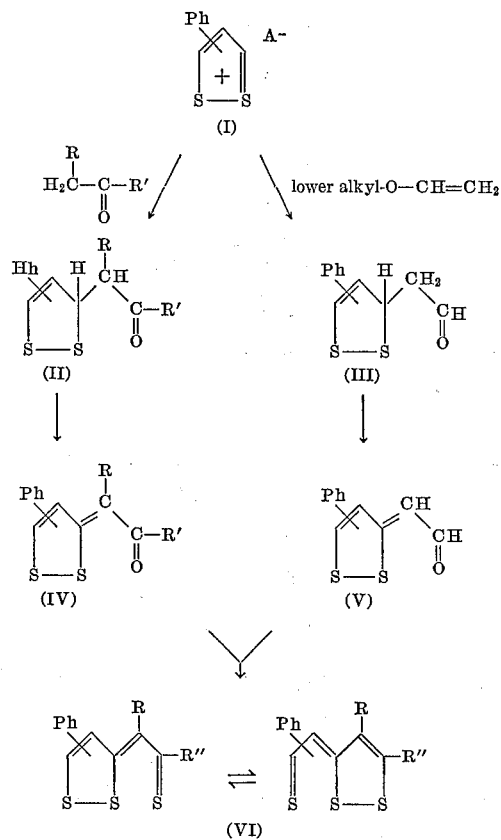

From the foregoing flow sheet, it will be noted that a 4- or 5-phenyl dithiolium salt (I) is the starting material for obtaining thiothiophthenes by the process of this invention. The phenyl group ("Ph") thereof may be unsubstituted or it may have one or two lower alkyl or nitro groups substituted thereon. The anion ("A—") thereof may be derived from any strong acid since its structure is not critical to the operation of this invention. Illustrative acids are fluoboric, sulfuric, perchloric, hydrochloric, hydroiodic, hydrobromic, phosphoric or nitric acids. These dithiolium compounds are fully disclosed in copending application, Serial No. 27,254, filed May 6, 1960, now abandoned.

Compound I is treated with either a lower alkyl vinyl ether (e.g., methyl and ethyl vinyl ether) or a ketone of the formula:

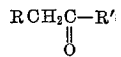

wherein R is hydrogen, phenyl, lower carbalkoxy or cyano; and R′ is a lower alkyl, benzyl, lower carbalkoxymethyl, a phenyl radical (either unsubstituted or having either a di-lower alkylamino, nitro or lower alkanoyl substituent), thienyl or naphthyl. The reaction occurs under mild conditions. The ether reacts readily even at room temperature in an aqueous system, while the ketone may be refluxed in a solvent such as ethanol, isopropyl alcohol or nitromethane. The product first formed is the acylmethyl dithiole (II) or (III). In many cases, this spontaneously dehydrogenates, under the reaction conditions, to the desired acylmethylene dithiole (IV) or (V), but, when this does not occur, the product can be dehydrogenated (in situ, if desired) by treatment with a quinone of high redox potential such as chloranil, tetrachloro-1,2-benzoquinone or dichlorodicyanobenzoquinone.

Compounds IV and V can be sulfurized by refluxing with $P_2S_5$ in an aromatic solvent such as xylene or toluene to yield Compound VI wherein R″ is R′ or hydrogen.

As will be appreciated from the foregoing, the process of this invention provides a simple and direct method for obtaining thiothiophthenes from dithiolium starting materials. These thiothiophthenes are characterized by a no-bond resonance structure, i.e., in which the three sulfur atoms are collinear and equally spaced. Consequently, it is not possible to specify which sulfur atom is bonded, and which not bonded, to the central sulfur atom. This structure is represented by the resonating formulas shown above, and is to be understood even when only one formula is given for a compound as in the examples and claims.

The new method provided by this invention permits the preparation of compounds which are not obtainable by previously known methods for the preparation of thiothiophthenes. These new compounds, termed 3,5-epidithio-4-Ph-2-R-1-R″-1-thiono-penta-2,4 - dienes, wherein "Ph," R and R″ are as above-defined, have a variety of uses. They show herbicidal activity and may be used to reduce unwanted dicotyledenous plant growth. They are also useful as chemical intermediates and as dyestuffs for cellulose acetate and other fibers.

The following examples are presented to illustrate the various aspects of this invention.

Example 1

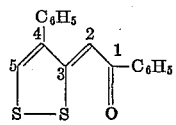

A solution of 3.0 g. of 4-phenyl-1,2-dithiolium hydrogen sulfate and 1.1 ml. of acetophenone in 40 ml. of alcohol is refluxed for three hours, chilled and filtered. The yellow product is crystallized from methylcyclohexane. M.P. 157° C.

Example 2.—3,5-epidithio-1,4-diphenyl-1-thiono-penta-2,4-diene

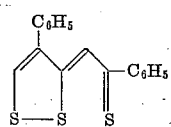

A mixture of 3.0 g. of the product of Example 1, 2.5 g. of $P_2S_5$, and 50 ml. of toluene is stirred and refluxed for one hour, cooled, filtered and evaporated. The purple product is crystallized from hexane. M.P. 130° C.

*Example 3*

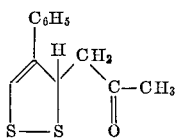

Four grams of 4-phenyl-1,2-dithiolium hydrogen sulfate are refluxed for two hours in 250 ml. of isopropyl alcohol and 300 ml. of acetone. After removal of solvent by evaporation at room temperature, the yellow product is isolated and crystallized from hexane. M.P. 79° C.

*Example 4*

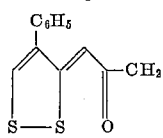

A mixture of 1.0 g. of the condensation product of 4-phenyldithiolium hydrogen sulfate and acetone (Example 3) and 1.1 g. of chloranil is stirred and refluxed in 25 ml. of benzene for one-half hour and cooled. Filtration removes tetrachlorohydroquinone, and the product is obtained by evaporating the benzene. It is purified from hexane. M.P. 114° C.

The same product is obtained if 4-phenyldithiolium hydrogen sulfate and acetone are reacted as described in Example 3, followed by the addition of an equivalent of chloranil to the reaction mixture and refluxing for half an hour.

*Example 5*

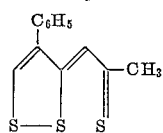

A mixture of 2.0 g. of the product of Example 4 and 1.9 g. of phosphorus pentasulfide in 80 ml. of benzene is stirred and refluxed for one hour, filtered, and evaporated. The product is crystallized from hexane. M.P. 85° C.

*Example 6*

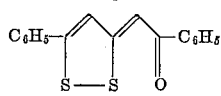

A solution of 2.5 g. of 3-phenyl-1,2-dithiolium hydrogen sulfate in 150 ml. of alcohol is stirred and refluxed while a solution of 0.5 g. of acetophenone in 15 ml. of alcohol is added during two hours. The solution is refluxed a few minutes longer and then cooled and evaporated. The product is crystallized from hexane.

It is converted to its thioketo analog by the procedure of Example 2.

*Example 7*

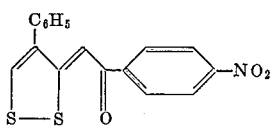

A solution of 2.7 g. of 4-phenyl-1,2-dithiolium fluoborate and 1.7 g. of p-nitroacetophenone in 35 ml. of alcohol is refluxed until the reaction is complete, cooled, and filtered. The orange product is crystallized from toluene. M.P. 261° C.

*Example 8*

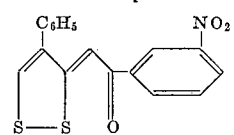

A solution of 2.7 g. of 4-phenyl-1,2-dithiolium fluoborate and 1.7 g. of m-nitroacetophenone in 50 ml. of alcohol is stirred and refluxed for six hours, cooled, and filtered. The product gives yellow crystals from toluene. M.P. 215° C.

*Example 9*

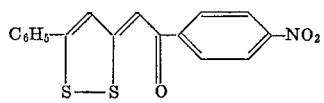

A solution of 4.1 g. of 3-phenyl-1,2-dithiolium hydrogen sulfate and 1.7 g. of p-nitroacetophenone in 55 ml. of alcohol is stirred and refluxed for 3.5 hours and then cooled. The product is crystallized from toluene. M.P. 280° C.

Similar results are obtained if nitromethane is used in place of the alcohol solvent.

*Example 10*

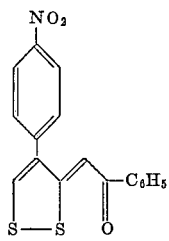

Four grams of 4-p-nitrophenyl-1,2-dithiolium hydrogen sulfate and 1.2 ml. of acetophenone are refluxed for four hours in 200 ml. of alcohol and filtered at the boil. The yellow product is crystallized from a mixture of toluene and methylcyclohexane. M.P. 230° C.

*Example 11*

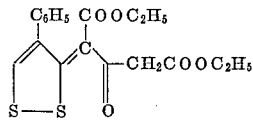

A solution of 2.5 g. of 4-phenyl-1,2-dithiolium hydrogen sulfate and 1.5 g. of diethyl acetonedicarboxylate in 75 ml. of alcohol is refluxed for three hours, chilled and filtered. The product is crystallized from methylcyclohexane. M.P. 206° C.

It is converted to its thioketo analog by the procedure of Example 2.

*Example 12*

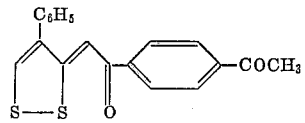

A solution of 20 g. of 4-phenyl-1,2-dithiolium hydrogen sulfate and 9.7 g. of p-diacetylbenzene in 250 ml. of alcohol is stirred and refluxed for four hours, cooled and filtered. The product is crystallized from dilute methoxyethanol. M.P. 230° C.

It is converted to its thioketo analog by the procedure of Example 2.

Example 13

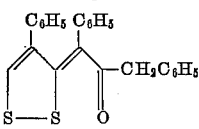

A solution of 5.0 g. of 4-phenyl-1,2-dithiolium hydrogen sulfate and 1.1 g. of dibenzyl ketone in 300 ml. of alcohol is refluxed for sixteen hours, diluted, cooled and filtered. The orange product is crystallized from hexane. M.P. 121° C.

Example 14

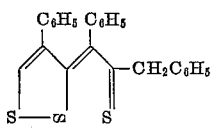

A mixture of 5.0 g. of the product of Example 13, 4.1 g. of P₂S₅ and 50 ml. of toluene is stirred and refluxed for two hours, cooled, filtered and evaporated. The orange product is crystallized from hexane.

Example 15

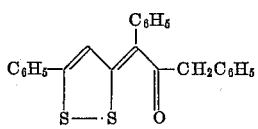

A mixture of 5.0 g. of 3-phenyl-1,2-dithiolium hydrogen sulfate and 2.9 g. of dibenzyl ketone in 120 ml. of alcohol is stirred and refluxed one and one-half hours, cooled and filtered. The product is crystallized from methylcyclohexane. M.P. 159° C.

It is converted to its thioketo analog by the procedure of Example 2.

Example 16

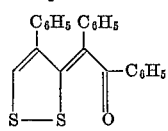

Four grams of 4-phenyl-1,2-dithiolium hydrogen sulfate and 2.0 g. of desoxybenzoin are stirred and refluxed in 50 ml. of alcohol for three hours, cooled and filtered. The yellow product is crystallized from methylcyclohexane. M.P. 217° C.

Example 17

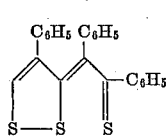

A mixture of 5.0 g. of the product of Example 16, 3.3 g. of P₂S₅ and 85 ml. of toluene is stirred and refluxed for one hour, cooled, filtered and evaporated. The purple product is crystallized from hexane. M.P. 180° C.

Example 18

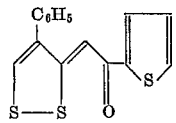

A solution of 5.0 g. of 4-phenyl-1,2-dithiolium hydrogen sulfate and 1.3 g. of 2-acetylthiophene in 150 ml. of alcohol is refluxed for two hours, cooled and filtered. The product gives yellow crystals from hexane. M.P. 132° C.

It is converted to its thioketo analog by the procedure of Example 2.

Example 19

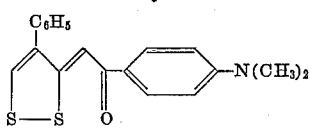

Five grams of 4-phenyl-1,2-dithiolium hydrogen sulfate and 4.0 g. of p-dimethylaminoacetophenone are stirred and refluxed in 70 ml. of alcohol for four hours. The product is crystallized from methoxyethanol. M.P. 211° C.

Example 20

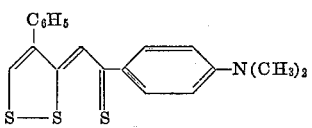

A mixture of 1.0 g. of the product of Example 4, 0.67 g. of P₂S₅, and 20 ml. of toluene is stirred and refluxed for ten minutes, cooled, filtered and evaporated. The deep red product is crystallized from hexane. M.P. 176° C.

Example 21

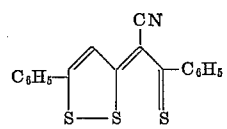

A mixture of 1.5 g. of the condensation product of 3-phenyl-1,2-dithiolium hydrogen sulfate with benzoylacetonitrile, 2.0 g. of phosphorus pentasulfide and 25 ml. of xylene is stirred in refluxed for one hour, filtered hot, and allowed to crystallize. The orange product is crystallized from butyl acetate. M.P. 217° C.

Example 22

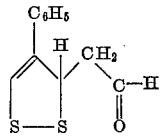

A solution of 2.8 g. of 4-phenyl-1,2-dithiolium hydrogen sulfate in 200 ml. of water is stirred at room temperature and 1–2 ml. portions of ethyl vinyl ether added at 10–15 minute intervals until the reaction is complete. The yellow product is filtered and dried; it is crystallized from hexane. M.P. 64° C.

Example 23

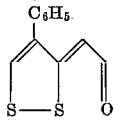

A mixture of 2.2 g. of chloranil and and 2.0 g. of the condensation product of 4-phenyldithiolium hydrogen sulfate with ethyl vinyl ether (Example 22) is refluxed in 20 ml. of benzene for one-half hour, cooled, filtered and evaporated. The product is crystallized from hexane. M.P. 116° C.

Example 24

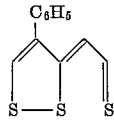

A mixture of 0.60 g. each of P₂S₅ and the product of Example 23 is stirred and refluxed for twenty minutes, filtered, and evaporated. The purple product is crystallized from hexane. M.P. 63° C.

Example 25

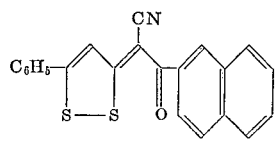

3-phenyl - 1,2 - dithiolium hydrogen sulfate and 2-naphthoylacetonitrile are condensed as described in Example 1. The product is crystallized from trichloroethylene or acetic acid. M.P. 192° C.

Example 26

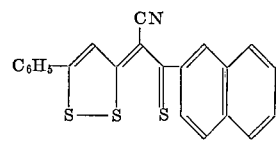

The product of Example 25 is reacted with phosphorus pentasulfide in refluxing xylene as described in Example 21. The product is crystallized from butyl acetate.

I claim:
1. A method of preparing a compound of the formula:

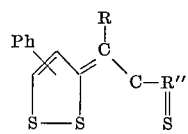

wherein "Ph" is a member selected from the group consisting of phenyl, nitrophenyl and lower dialkylaminophenyl; R is a member selected from the group consisting of hydrogen, phenyl, lower carbalkoxy and cyano; and R'' is a member selected from the group consisting of hydrogen, lower alkyl, benzyl, lower carbalkoxymethyl, phenyl, di-lower alkylaminophenyl, nitrophenyl, lower alkanoylphenyl, thienyl and naphthyl, which comprises reacting a dithiolium salt of the formula:

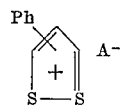

wherein "Ph" is as defined above and A⁻ is the anion of a strong acid, with a member selected from the group consisting of a lower alkyl vinyl ether and a ketone of the formula:

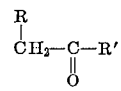

wherein R' is a member selected from the group consisting of lower alkyl, benzyl, lower carbalkoxymethyl, phenyl, di-lower alkylaminophenyl, nitrophenyl, lower alkanoylphenyl, thienyl and naphthyl and R is as defined above, to yield a first intermediate of the formula:

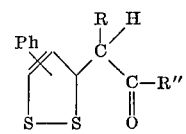

wherein "Ph," R and R'' are as defined above; dehydrogenating said first intermediate to yield a second intermediate of the formula:

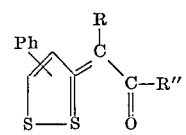

wherein "Ph," R and R'' are as defined above; and then sulfurizing said intermediate by refluxing the same with $P_2S_5$ in an aromatic solvent to thereby obtain the desired compound.

2. A compound of the formula:

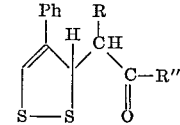

wherein "Ph" is a member selected from the group consisting of phenyl, nitrophenyl and lower di-alkylaminophenyl; R is a member selected from the group consisting of hydrogen, phenyl, lower carbalkoxy and cyano; and R'' is a member selected from the group consisting of hydrogen, lower alkyl, benzyl, lower carbalkoxymethyl, phenyl, di-lower alkylaminophenyl, nitrophenyl, lower alkanoylphenyl, thienyl and naphthyl.

References Cited by the Examiner

Behringer et al.: Angew. Chemie, vol. 72 (1960), pp. 415 and 416.

Guillouzo et al., Bull. Soc. Chim., Fr., 1963 (1), pages 153-7.

Lozach, Industrie Chim., Belge, vol. 26 (1961), pp. 1136 and 1137.

WALTER A. MODANCE, *Primary Examiner*.

JOHN D. RANDOLPH, *Examiner*.